United States Patent [19]
Choate

[11] 3,754,848
[45] Aug. 28, 1973

[54] HIGH SPEED SINGLE CAVITY MOLDING APPARATUS

[75] Inventor: James Robert Choate, Rochester, N.H.

[73] Assignee: CPI, Inc., Bristol, N.H.

[22] Filed: Nov. 10, 1971

[21] Appl. No.: 197,206

Related U.S. Application Data

[63] Continuation-in-part of Ser. No. 128,080, March 25, 1971.

[52] U.S. Cl. ............................. 425/242, 425/247
[51] Int. Cl. ................................................ B29f 1/02
[58] Field of Search ................ 425/451, 450, 242, 425/26, 247, 251, 252

[56] References Cited
UNITED STATES PATENTS

| | | | |
|---|---|---|---|
| 3,267,517 | 8/1966 | Altermatt | 425/242 X |
| 3,591,898 | 7/1971 | Stenmo | 425/249 |
| 3,659,995 | 5/1972 | La Grutta | 425/242 |
| 3,116,516 | 1/1964 | Moslo | 425/342 |
| 2,526,993 | 10/1950 | Bower | 425/453 X |
| 2,953,815 | 9/1960 | Mainardi | 425/324 |
| 2,183,983 | 12/1939 | Bostwick | 425/450 |

Primary Examiner—J. Spencer Overholser
Assistant Examiner—Michael O. Sutton
Attorney—Lee A. Strimbeck

[57] ABSTRACT

An automatic, single cavity injection molding apparatus especially useful for the manufacture of circular shaft oil seals reinforced with a metal case, having a trunnion-mounted, upper assembly through which molding material is injected under high pressure and then is liquefied and heated by being forced through an orifice in an upper mold half, a carriage supporting a pair of lower mold halves alternately pivotal to positions wherein one of said lower mold halves is in mating relationship with the upper mold half and the other is in a second position where the molded article is ejected and a new reinforcing casing can be inserted.

13 Claims, 11 Drawing Figures

Patented Aug. 28, 1973

INVENTOR
JAMES R. CHOATE
BY Lee A. Strimbeck
ATTORNEY

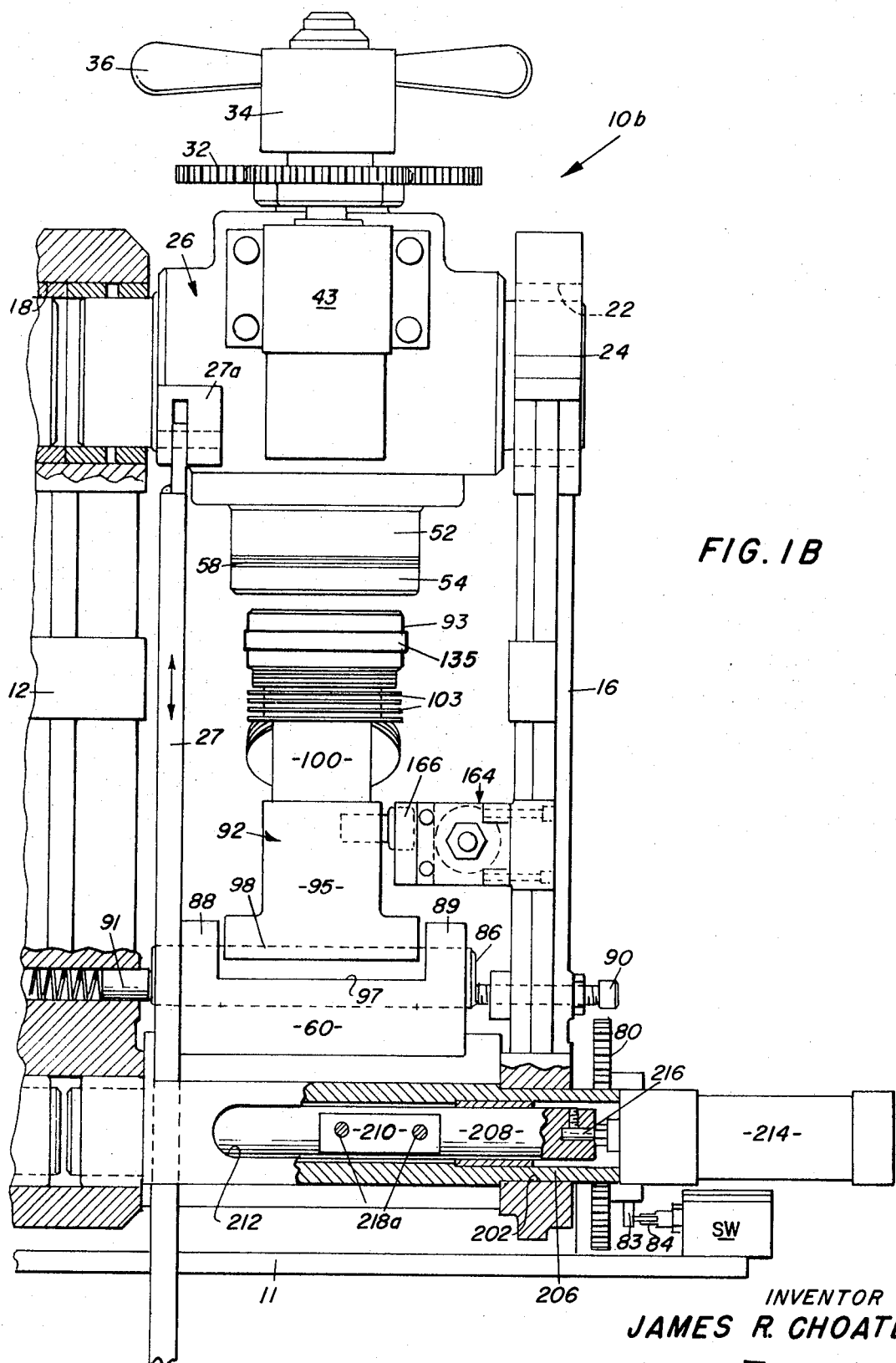

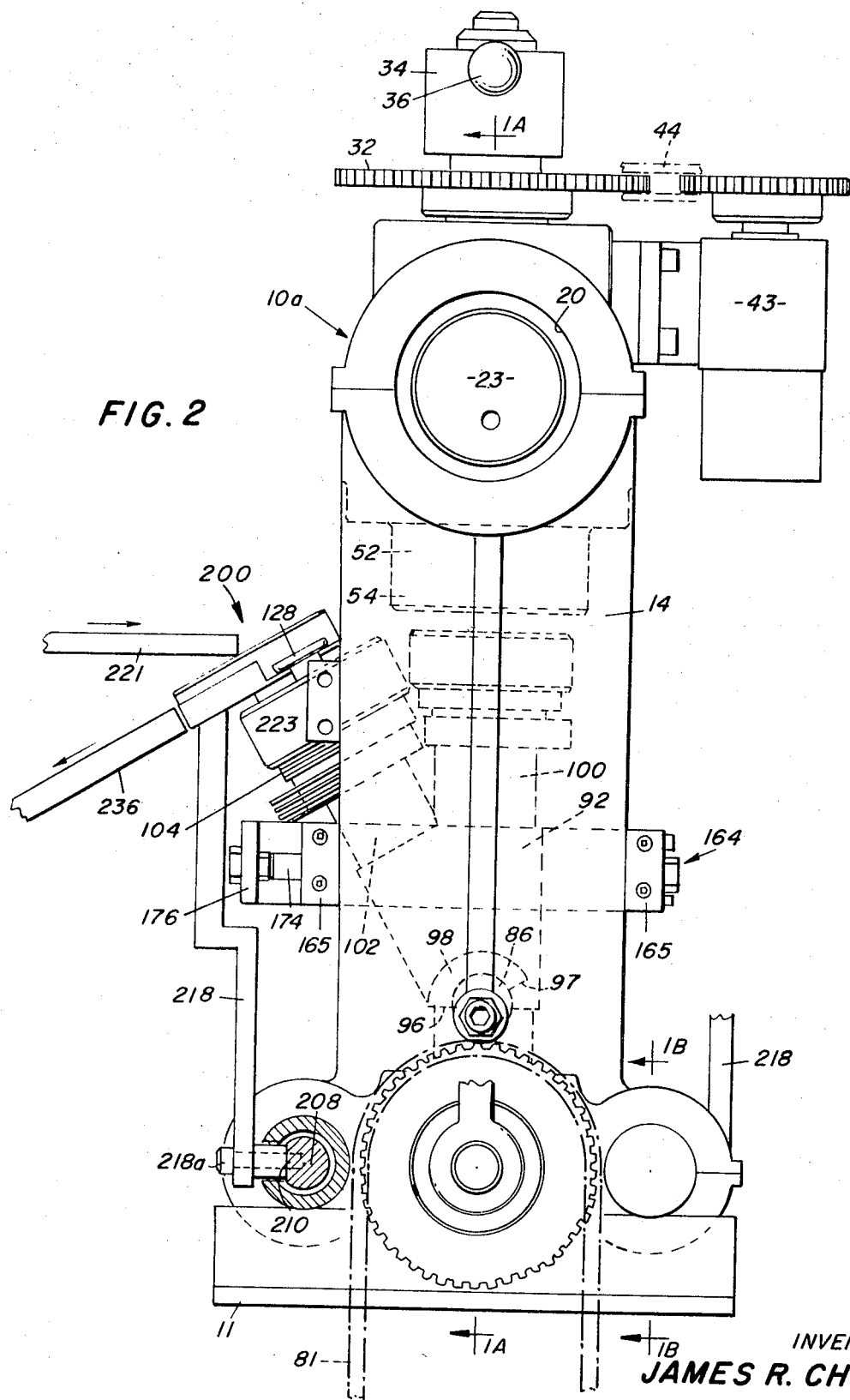

FIG. 3
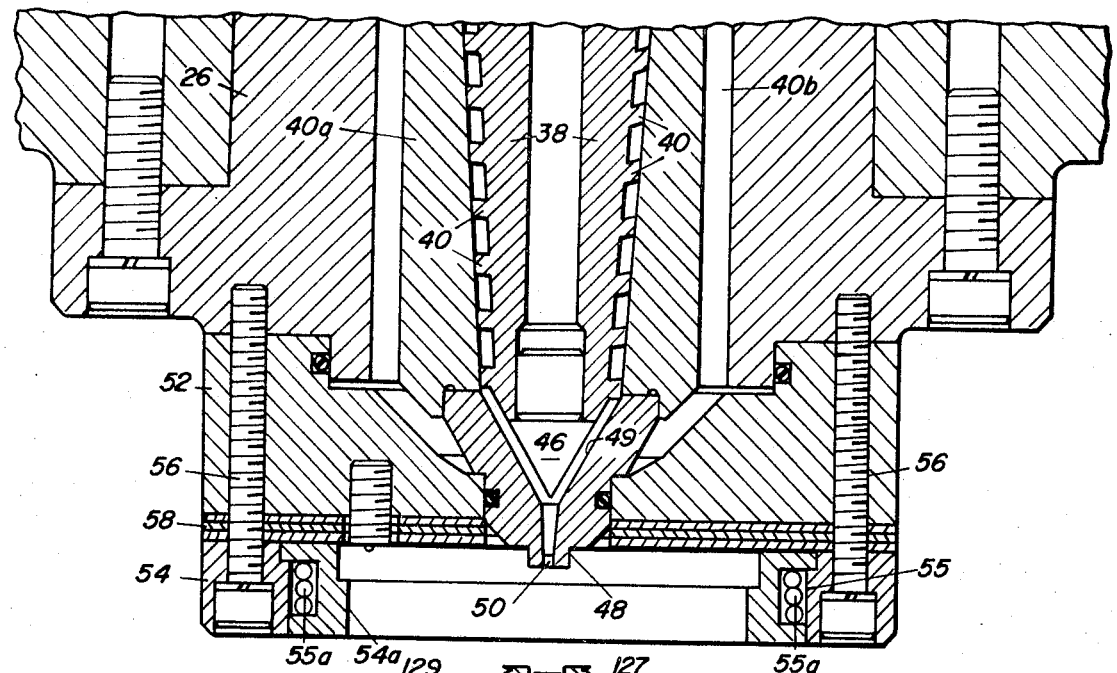
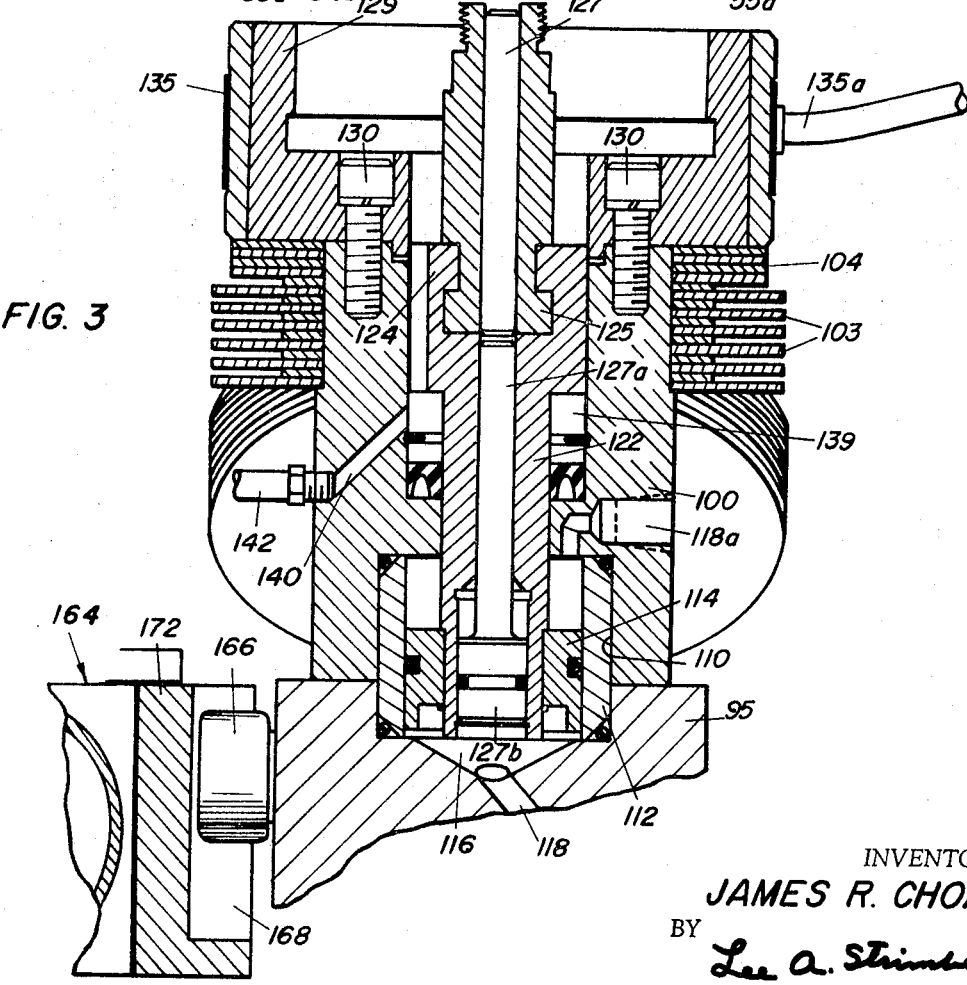
INVENTOR.
JAMES R. CHOATE
BY Lee A. Steinbeck
ATTORNEY

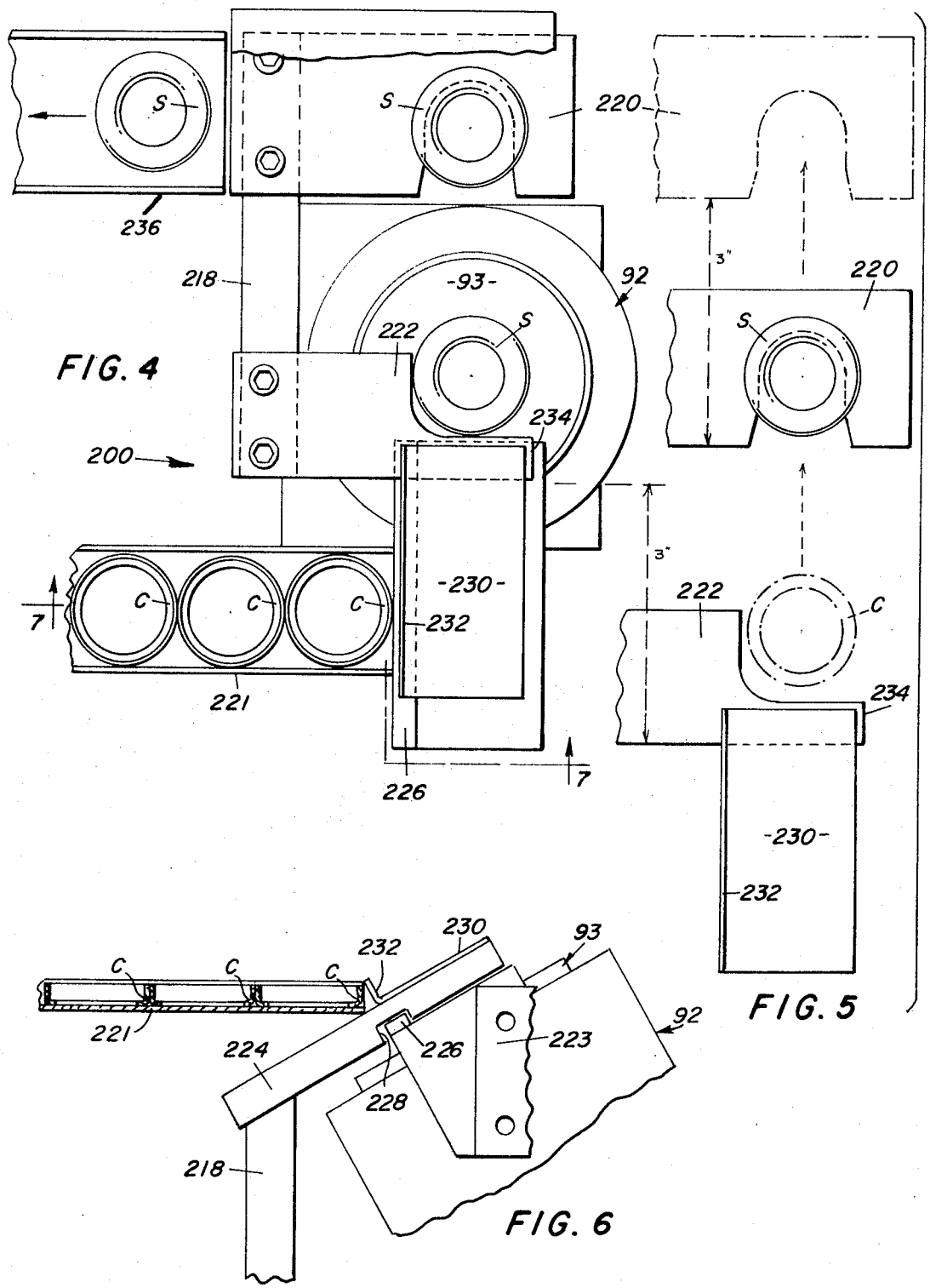

INVENTOR
JAMES R. CHOATE

BY

ATTORNEY

HIGH SPEED SINGLE CAVITY MOLDING APPARATUS

RELATED APPLICATION

This application is a continuation-in-part of "Single Cavity Injection Molding of Oil Seals," Ser. No. 128,080, filed Mar. 25, 1971, by the present inventor, which application discloses and claims inter alia, several types of molds suitable for use in the present injection molding apparatus.

This invention relates to an improved injection molding apparatus for the manufacture of precision molded parts, and has particular utility in the manufacture of precision molded oil seals.

Circular oil seals are used in great numbers by the automotive industry and others to prevent oil leakage from rotating shafts. Although substantial improvements in seal materials, seal design and seal applications have been made, there still exists a need for improved quality control in the manufacturing process so that the seals produced are capable of withstanding prolonged use. Heretofore, seals have been made for the most part with conventional molding equipment adapted to mold simultaneously a number of parts in a multi-cavity mold. Because of a variety of factors, including variations in pressures and temperature from one cavity to another, it is difficult to consistently produce seals to close tolerances and of uniform and reliable physical properties. These difficulties are particularly acute in the case of radial lip shaft seals. The radial lip (the portion that acts to retain the oil) must be of a precise size and concentricity. Significantly, prior art molding apparatus for precision molded products have been large, expensive and difficult to automate.

Accordingly, one of the primary objects of this invention is to provide improved automated single cavity injection molding apparatus for making improved precision products such as radial lip oil seals.

Another object of the invention is to provide new and improved apparatus adapted for injection molding products of heat formable, and preferably, thermosetting elastomeric materials, the apparatus being durable in construction, compact, reliable, and capable of molding parts to close tolerances.

Another important object of this invention is to provide a molding assembly wherein the molding units are accessibly mounted for ease of cleaning and repair and for ready replacement of parts, especially the mold heads.

A still further object of the invention is to provide a high speed injection molding apparatus which substantially eliminates air entrapment by subjecting the mold cavity to a vacuum just prior to feeding the liquified molding material into the mold cavity under high pressure.

A still further object of the invention is to provide means whereby the mold units are thermally isolated from the primary moving elements of the invention.

A still further object of the invention is to provide a molding assembly wherein upper and lower mold units are generally aligned through a pivot action with closer alignment being achieved by means of a cam follower travelling in a vertical slot and fine alignment with inter-engaging tapered or straight surfaces on the mold heads themselves.

A still further object of this invention is to provide a molding assembly wherein lower mold halves (two or more) pivot out of line with the axis of a single upper mold half to a discharge station wherein ejecting and stripping of the molded product from one of the lower mold halves is accomplished by the stroke of an ejection mechanism which forms part of the mold cavity while the other lower mold half is simultaneously brought into position under the upper mold half, the mold closed and injection and curing of the elastomer are carried out. This action will be more clearly understood by referring to the parent application.

Another object of the invention is to provide injection molding apparatus adapted to rapidly and accurately mold annular oil seals, including oil seals of the type having an embedded metal case.

An additional specific object is to provide injection molding apparatus comprising a pair of lower mold halves alternately movable to a first cavity defining position with a single upper mating mold half and means for automatically feeding cases into and removing molded parts from each movable lower mold half when in a second position, the two movable lower mold halves being movable vertically toward and away from the upper mold half and pivotally movable to their second positions.

These and other objects of the present invention are achieved by means of injection molding apparatus comprising a trunnion; an extruder head supported by the trunnion and oriented to extrude a moldable material, means for supporting an upper mold half section at the exit end of said extruder head, a mold carriage comprising means for supporting at least two lower mold halves each adapted to mate with the upper mold half, vertically reciprocal pivot means pivotally supporting the mold carriage, means for pivoting the mold carriage to a position wherein one of said lower mold halves moves into alignment with the upper mold half and the other of said lower mold halves moves out of alignment with the upper mold half, and means for vertically moving the pivot means so as to move the mold carriage toward or away from the upper mold half when the one of said lower mold halves is aligned with the upper mold half. The lower mold halves are spaced angularly about the pivot point of the mold carriage so that each is moved into alignment with the upper mold half as the carriage is pivoted. Means are provided for removing molded products from the lower mold halves and thereafter for automatically introducing casings into the lower mold halves.

The term "mold half" is used for convenience. It does not mean that the part referred to necessarily forms a true "half" of the mold or mold cavity, but instead, should be taken to mean the part referred to forms at least a significant part of the total mold assembly, as considered separately from the molding machine.

DRAWINGS

FIG. 1B is a side elevation of a similar unit mounted on the same console as the apparatus of FIG. 1A and is taken along the lines 1B—1B of FIG. 2;

FIG. 2 is an end view taken from the left of FIG. 1A;

FIG. 3 is an enlarged cross-section of a portion of FIG. 1A, illustrating in particular the mold carrier used to mount each mold half, but not showing the mold halves per se;

FIG. 4 is a top plan view of a casing feed means and a finished product ejection means;

FIG. 5 is a diagrammatic view showing the operation of the means of FIG. 4;

FIG. 6 is a front elevation view of the apparatus of FIG. 4;

Figure 1A:
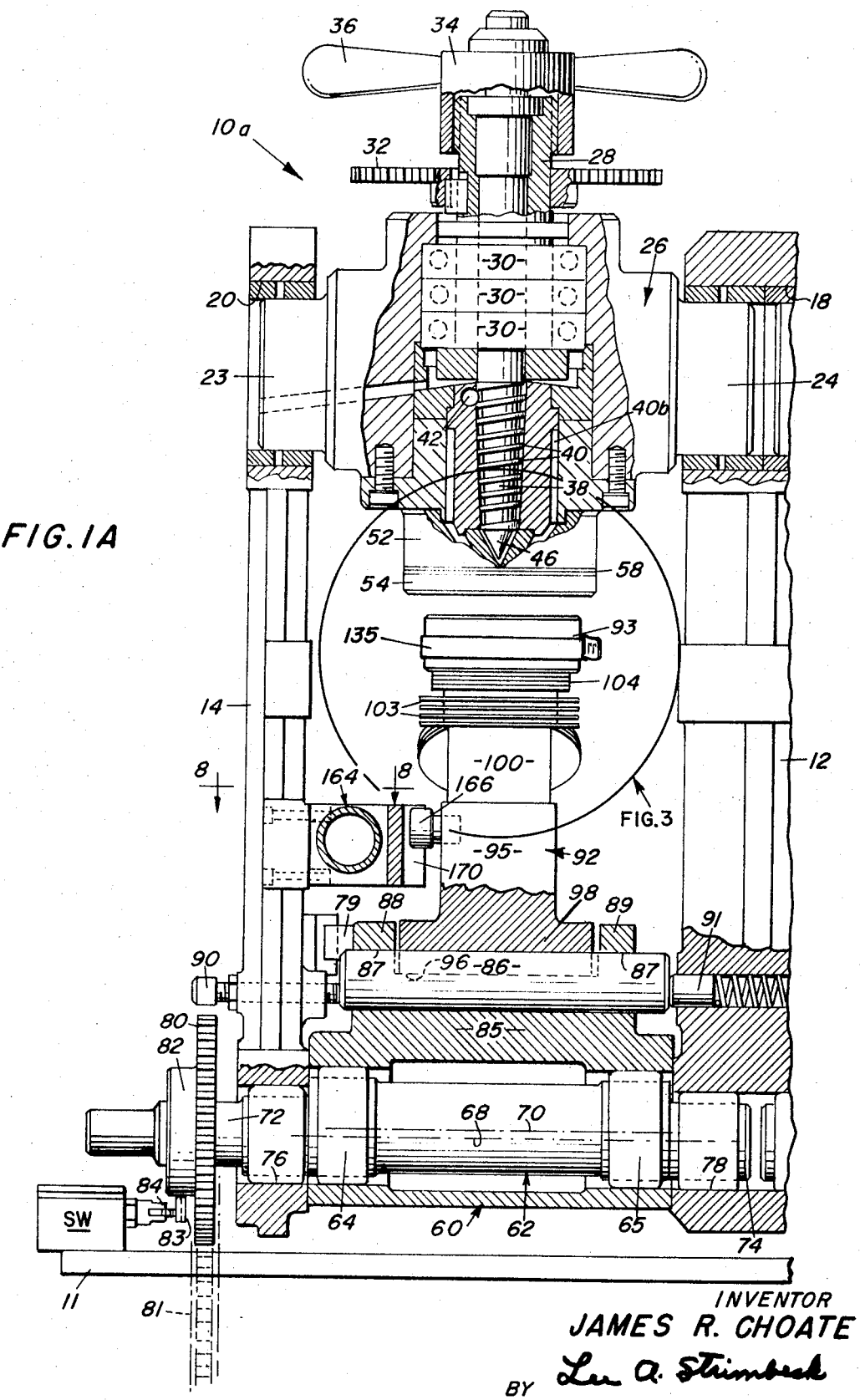
FIG. 1A is a side elevation of a molding unit, partly in section, taken along the line 1A—1A of FIG. 2.

Referring now to the drawings wherein like elements are indicated by like numerals, the numerals 10a and 10b indicate two side-by-side molding assemblies mounted on a common console 11 and juxtaposed to present a mirror image to one another. Each of the assemblies 10a and 10b includes an upper mold carrier and a pair of lower mold carriers. Each pair of lower mold carriers has a common base and drive means.

Since these assemblies and their associated operating elements are substantially identical, the numerals of assembly 10a will be applied to the FIG. 1B view of assembly 10b which generally constitutes a rear view of FIG. 1A. In other words, unit 10b is behind unit 10a as displayed in FIG. 2. In some instances the same numerals have been used to indicate corresponding elements in the respective molding assemblies. This technique has been employed to reduce the number and complexity of the drawings.

Each one of the lower mold carriers has associated therewith a means to feed a reinforcing case thereto and extract a molded unit therefrom. For purposes of clarity, only one of these feed and discharge assemblies will be described (FIGS. 4, 5 and 6).

The body portion of the console 11 includes the operating controls of the apparatus and is located about waist-high so that the mold assemblies are conveniently accessible to an operator. Extending upwardly from console 11 is a middle standard or upright 12 and a pair of end uprights 14 and 16 spaced to either side thereof. The assembly 10a is located between uprights 12 and 14 and the assembly 10b is located between uprights 12 and 16. The upper end of the upright 12 is formed with a middle mounting bore 18 and the upper ends of uprights 14 and 16 are respectively formed with mounting bores 20 and 22. The bores 18 and 20 receive ends 23 and 24 of an upper mold carrier or trunnion 26 and the other end of bore 18 and bore 22 receives opposite ends of an upper mold carrier 26 of unit 10b. Carriers 26 can be secured in a fixed position by any convenient lock means such as a pin or key. However, in the embodiment shown, the carrier is swingable to a position wherein the lower end thereof is accessible to an operator by a motion of the rod 27 movable vertically by power means within the console. Rod 27 is connected to the carrier by way of the lug and pin assembly 27a. The ability to swing the carrier or trunnion 26 about its axis facilitates repair and permits a ready replacement of the upper mold half.

A quill 28 is rotatably received within the carrier by way of ball bearings 30. A sprocket 32 is keyed to the upper end of the quill 28. Above the sprocket 32, a cap member 35 is splined to the quill. A handle 36 is secured to the cap 34. The handle 36 permits the removal of the quill when desired. Attached to the quill 28 for rotation therewith is a feed screw 38 which, for purposes of cooling, can be hollow. The feed screw is formed with an exterior spiral 40 to which a cord of elastomeric material is fed from a supply reel through a passageway 42. The feed screw is turned via the sprocket 32 which is attached to a hydraulic motor 43 by way of a chain member 44.

As best seen in FIG. 3, the feed screw 38 at its lower end is formed with a conical end 46. A nozzle member 48 surrounds the conical surface in spaced relationship to define a conical feed chamber 49 terminating in an orifice 50. Orifice 50 is best seen in the enlarged view of FIG. 3. The cord of elastomeric material is forced downwardly upon rotation of the quill through the chamber of 49 and orifice 50 into the upper mold half.

The barrel 40a of the injection screw is preferably surrounded by a chamber 40b to which a liquid heat exchange medium can be supplied to provide heating during start-up and cooling while running to remove excess heat generated by shearing of the elastomer.

The nozzle 48, a retaining ring 52 and a manifold ring 54 are secured to the lower end of carrier 26 by way of screws 56. The manifold 54 circumscribes the upper mold unit and is provided with a bayonet twist lock lugs 54a to receive the upper mold half. A chamber 55 in manifold 54 is provided with electric heating elements 55a. A plurality of thermo-isolating layers 58 are disposed between manifold 54 and the retaining ring 52. These layers isolate the mold heat and help protect uncured elastomeric material in the feeding grooves from being excessively heated.

Figure 8:
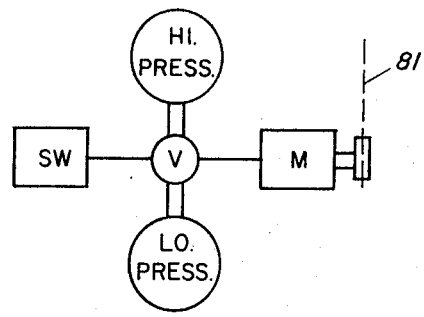
FIG. 8 is a diagrammatic of a control mechanism associated with the final closing of the mold parts.

Thus, the upper mold carrier 26 primarily consists of a means to feed an elastomeric material to the cavity of an upper mold half mounted on the lower end of the carrier such as the one illustrated in FIG. 8 of the parent application.

Disposed between the lower ends of uprights 12 and 14 below carrier 26 is a casting 60 having an eccentric shaft 62 rotatably mounted therein by way of needle bearings 64 and 65. The center of shaft rotation is indicated by the numeral 68 and the offset eccentric axis (in its uppermost position) is indicated by the numeral 70. Extensions 72 and 74 of the shaft 62 are mounted for rotation in lower bores 76 and 78 of the uprights 12 and 14, respectively. The sprocket, in turn, is driven by a reversible hydraulic motor in the console. A hub 82 of sprocket 80 is formed with a pin 84 which is adapted to trip a sensing arm 86 of a microswitch SW. The purpose of this will be understood more fully hereinafter.

The casting 60 is formed with a cradle surface 85 which supports a rocker shaft 86 throughout its length. The rocker shaft 86 is supported in bores 87 formed in uprights 88 and 89 of the cradle. The horizontal position of rocker shaft 86 is adjustable by way of a turnscrew 90 acting in opposition to the spring-biased positioning lug 91. This is important in longitudinally aligning the lower mold unit with the upper mold unit. Secured to rocker shaft 86 is a toggle assembly 92 comprised of base 95 having a pair of lower mold carrying rocker arms 100 and 102. At their upper surfaces, the rocker arms 100 and 102 carry the lower mold units 93 which are thermally isolated by thermo-isolating wafers 104. The assembly 92 is secured to the rocker shaft 86 by bolts and the arms 100 and 102 are disposed at about a 30° offset from each other but are in the same vertical plane as the upper mold unit. The cradle surface 85 is semicircular and has horizontal surfaces 96 and 97 on either side thereof. A flange 98 at the lower end of base 95 defines an arc of about 150°. See FIG. 2 where it can be seen that surfaces 96 and 97 are in a horizontal plane or at 180° from one another.

Each of the rocker arms for each lower mold unit is the same and, therefore, a description of the interior of arm 100 will suffice. Referring to FIG. 3, it can be seen that the lower end of rocker arm 100 is counterbored at 110. A cylindrical guide sleeve 112 is received therein. The cylindrical sleeve 112 receives a piston member 114 which is slidably received within the sleeve. Movement of the piston is in response to the application of hydraulic pressure in the cavity 116 through a port 118 and exhaust port 118a. Piston 114 carries a piston rod 122. At its upper end, piston rod 122 is undercut and has bayonet-type locking lugs for the reception of bayonet-type lugs 125 of a removable mold stem 126 which is threaded at its upper end to receive the centerpiece of the lower mold half. (Stem 126 corresponds to part 84 of FIG. 8 of the parent application.)

To secure a double eject effect, i.e. lifting of the center piece followed by knock out of a flash-lock plug, rod 122 and mold stem 126 are bored to receive a two piece ejector pin 127 (corresponds to part 87 of said FIG. 8), and 127a, which latter terminates in a piston 127b communicating with cavity 116. In operation, since the surface area of piston 114 is larger, the application of hydraulic pressure in cavity 116 first causes piston 114 and stem 126 to lift, which is followed by further lifting of ejector pin 127. Their return can be assited by springs (not illustrated).

A manifold ring 129 is secured to arm 100 by way of bolts 130. The mold unit is heat-isolated from the arm by way of the insulating wafers 104. Manifold ring 129 has an electric-band heating element 135 and lead 135a to maintain a temperature of about 375° – 500°F. A passageway 140 connects the interior 139 of the assembly to a vacuum system via hose 142. Heat radiating fins 103 can be provided, as illustrated.

Figure 7:
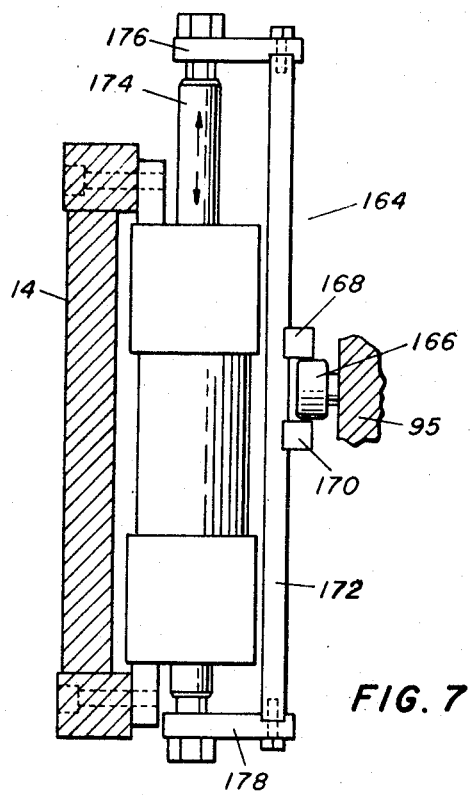
FIG. 7 is an enlarged view of a mover assembly taken along line 7 of FIG. 1A.

Turning to FIG. 7, a double-acting hydraulic jack assembly 164 alternately moves the lower mold units of the respective arms 100 and 102 into alignment with the upper mold unit. The jack assembly 164 is affixed to the standard 14. A follower 166 is attached to the base 95 between a pair of rails 168 and 170 of a drive bar 172. The bar 172 is attached to the outer ends of a piston arms 174 at 176 and 178. Of course, a similar piston assembly is affixed to standard 16 for movement of unit 10b. The piston stroke is of a length to oscillate the arms 100 and 102 through a 30° arc. Since the jack assembly is in an area affected by heat, the piston stroke might be expected to vary. However, by having the outer ends of piston arms 174 affixed to the bar 172, any expansion of contraction of the cylinder assembly will be equal and the bar 172 will continue to accurately locate the lower mold unit with respect to the upper mold unit regardless of small changes in piston stroke length.

As previously described, the jack assembly 164 alternately moves the lower mold units from their mold-forming stations to a discharge station generally indicated by the numeral 200 (FIG. 2) of which there are two per mold, one on each side. Disposed approximately below the station 200, the uprights are formed with bores 202 (FIG. 1B) which receives therein a reciprocating rod 208 having surface 210 disposed opposite a window 212 formed in sleeve 206. The member 208 is reciprocated by virture of a double-acting cylinder 214 which is connected to the sleeve at connection point 216. As best seen in FIG. 2, an upright 218 is affixed to surface 210 and follows its reciprocating movement. Referring now to FIGS. 4, 5 and 6, it can be seen that member 218 at its upper end supports a discharge member 220 and a feed member 222.

A mounting plate 223 of upright 14 carries a support table 224 below the assistants 220 and 222. The support table 224 is formed with a track member 226. The feed assistant 222 has a groove 228 in its lower surface which engages and is guided by the track member 226. The feed assistant 222 is disposed opposite an elongated magazine 221 which is adapted to feed casings C to the support table 224. The feed member moves from a start position as shown in FIG. 5 to a position over the lower mold as seen in FIG. 4. An intercept bar 230 having a flange 232 is mounted to feed member 222. The intercept bar retains the casing in the magazine until such time as the pusher is withdrawn to the start position, its feed finger 234 and the bar 230 are disposed beyond the magazine and a single casing is permitted to fall to table 224. Upon a reciprocation of member 222, the casing is moved to a position over the lower mold unit and falls into the mold unit. The mold, with a fresh casing received, is then pivoted to the vertical molding position.

After a molding operation is performed, the lower mold is again pivoted or oscillated to position 200. Because of the action of the stem 126, the finished molded seal S is moved upwardly of the mold area by the time it reaches position 200. The discharge member 220, by action of upright 218, is moved to an area below the finished molded seal S, as seen in FIG. 5. As member 220 is withdrawn to the dotted line position of FIG. 5, the finished seal S is discharged into a chute 236.

A sequence of operation can be said to start upon the introduction of a case C into the lower mold half 93 at station 200. The case automatically aligns itself radially with the mold and also establishes, because of special swayed protrusions in the edge thereof, and maintains throughout the molding process, a fixed spacing from the mold cavity walls. This positioning is accomplished without the use of pins. Pins are costly, prohibit mechanical rotary cleaning of the mold, and cause impediments to flow that can lead to an early build-up of over-cured elastomer lumps behind the pins. After reception of a casing, the lower mold half is oscillated into the same vertical axis as the upper mold half. The lower mold half is then moved toward the upper mold half. Tapered alignment surfaces on each mold half guide the mold close-off surfaces into intimate contact. The vertical movement is accomplished by the eccentric 62 acting on the toggle assembly which is retrained to a vertical straight line motion on its free end by an extension riding in a vertical bearing guide 79.

The preliminary closing of the mold halves is under a low hydraulic motor pressure insufficient to crush or shear a casing if such should be misaligned so as to interfere with the mold closing. This low hydraulic pressure is a sensing closure. If the mold can close all the way under low pressure, the electrical limit switch SW is activated by lug 83 causing the introduction of high hydraulic pressure to motor driving chain 81. The molds are then held tightly closed by the hydraulic pressure acting through the eccentric which is now within a few degrees of its top dead-center locking position. If there is an interference to mold closing, the switch 88 will not be activated. The object, of course, is to prevent mold damage, especially when relatively soft, substrate plated molds are used. If the high pressure is not applied, corrective action can be taken before damage to the molds.

Hydraulic pressure in cavity 116 raises stem 126 within the confine of the mold cavity M causing an evacuation of the mold cavity prior to the introduction of the elastomer. Thus, the mold is composed of three sections: the upper mold half (through which the elastomer is introduced), the lower mold half, and the centerpiece which moves vertically in relation to the lower mold half for the purpose of ejecting the finished workpiece. The stem 126 acts as a valve for the removal of air from the mold.

After mold closing, elastomer is introduced into the evacuated mold. As the elastomer enters the mold, it is substantially liquefied by being forced through a fine orifice and it initially applies pressure to the slightly raised centerpiece forcing it and stem 126 back to their closed sealing positions, thus closing the vacuum path. The elastomer is propelled into the mold through a reduced path at such high velocity and in so little elapsed time that a tremendous pressure drop or energy loss occurs. This energy loss is converted into heat internally within the elastomer, which heat effects the rapid internal cure of the elastomer without a "case hardening" effect.

The elastomer fills the mold until it reaches all boundaries. At this time, hydraulic pressure of the liquid elastomer develops to a high degree and, in conjunction with the elastomer heat, causes an almost immediate cure.

After the cavity M is filled, the machine pauses during curing. Note the physical separation of the temperature zones. This is accomplished by the insulation layers and the liquid cooling between the mold proper and the screw-nozzle complex. When the mold opens, the cured elastomer connected to the molded product extends into orifice 50 a fraction of an inch and necks down and breaks off at a line of demarcation between cured and uncured elastomer. Aside from the physical temperature separation, it should be noted that the elastomer in the screw and nozzle has not been subjected to the pressure drop or temperature rise and hence requires a much longer time, even in the same heat environment, to effect a cure.

After the pause, the mold halves are separated, the lower mold half 93 moving down and away from the fixed upper mold half. The lower arm then pivots out of line of the axis of the upper mold half and the other (empty except for metal case) lower mold half moves into position. The second mold half moves into the fixed upper mold half and the cycle is repeated. The finished mold unit is taken from the lower mold half by the member 220 and a fresh case is fed into the vacated mold by member 222.

To aid in the ejection of the finished seal, a vertical stroke of the centerpiece stem 126 is employed. The centerpiece of the lower mold half when in the discharge position can be raised to the limit of stroke of its actuating piston 114. This is sufficiently high to raise the molded element so that stripping plate 220 can enter below the molded element with the part then being stripped by allowing the centerpiece to return downwardly. As the plate moves sideways, it effects removal of the molded product with the same motion that slides a new case over and into the then vacant lower mold cavity.

The molds are provided with bayonet twist lock mounts readily removable by inserting an insulated handle spanner tool into the mold and twisting through 60°. Removal and insertion can be accomplished while the molds are hot. The ability to manually or automatically clean the molds in place is important. Cleaning must be accomplished in a matter of seconds so as not to interrupt the heat cycle of the machine and cause a cure in the elastomer in the nozzle awaiting the next cycle. The same applies to the removal of molds and the insertion of clean, preheated, fresh molds within a limited time. As can be appreciated, the upper mold carrier can be swung, hydraulically if desired, into a horizontal plane to expose the upper mold half for cleaning or replacement.

The mechanical efficiency of the injection barrel about the screw injector can be greatly increased and, consequently, its size can be kept quite small by placing grooves in the interior surface, in accordance with this invention. This design feature is desirable for some but not necessarily for all of the elastomers that may be processed.

Normally, in a screw injector, the rubber or plastic molding compound being driven forward by the screw tends to turn with the screw and to slip around the enclosing walls of the barrel with less of forward movement. A practical screw injection machine must be able to accommodate a wide range of or variations in compound properties not only to be able to process different types of compounds but also because a single compound's physical will vary from batch-to-batch or from day-to-day. Simply increasing the length of the barrel is not a satisfactory answer because aside from the mechanical design aspects, more power is lost in the barrel requiring more input power and resulting in needless working of the compound and loss in sensitivity in the control of the degree of working of the compound.

In the present invention, it is an object to inject the molding compound as quickly as possible past the injection orifices to secure maximum liquification or fluidity and an inefficient screw will not accomplish this.

Figure 9:
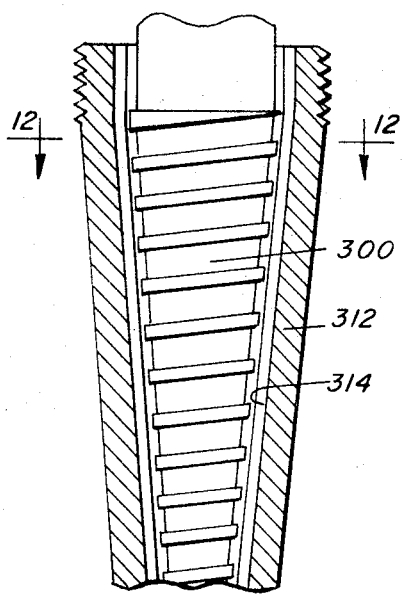
FIGS. 9 and 10 are diagrammatic showngs of a fluted screw and barrel feed arrangement.
Figure 10:
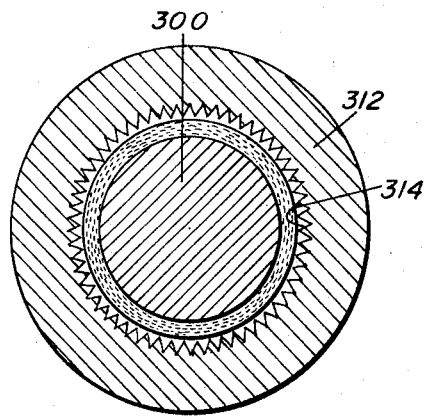

FIGS. 9 and 10 show a screw 300 and a barrel 312 of an injection machine. FIG. 12 is a cross section thereof, taken along line B—B of FIG. 11. As shown, the interior wall of the barrel is fluted or longitudinally grooved at 314 to prevent slippage of the molding composition being processed. The ridges can be quite fine, e.g. 0.005 inches deep and can be press-formed by forcing a suitably mated fluted mandrel into the barrel 312. While the fluting can be straight along the axis of the barrel, it is preferred to have the line of the fluting curved to follow the natural line of flow of the molding composition through the barrel.

In some applications, screw 300 can be hollow so that it can be water cooled. In some cases, the amount of heat created by the extrusion may be more than can conventionally be removed by cooling just the barrel. Also, a hollow screw can be supplied with a hydraulically operated clean-out pin which, when extended when the mold is open, can be used to knock out any partially cured material that may remain in injection nozzle 50. A pressure sensor can also be inserted through a hollow screw, if desired.

I claim

1. An injection molding machine comprising a framework, an extruder head, first means connected to said framework supporting said extruder head in a predetermined position, said extruder head oriented to extrude a moldable material downwardly, second means connected to said extruder head for supporting a male mold section at the exit end of said extruder head, a pivot carriage, an eccentric shaft rotatably supported in said framework, said eccentric shaft extending in a horizontal direction beneath said extruder head, third means guiding said pivot carriage for reciprocal movement vertically, fourth means rotatably coupling said pivot carriage to said eccentric shaft whereby rotation of said eccentric shaft in one direction moves said pivot carriage upwardly and rotation of said eccentric shaft in the opposite direction moves said pivot carriage downwardly, a mold carriage, means rotatably coupling said mold carriage to said pivot carriage whereby said mold carriage swivels in in a vertical plane relative to said pivot carriage, said mold carriage including means for holding first and second like female mold sections having first positions mating with said male mold section and forming a mold cavity, said first and second female mold sections being angularly moveable relative to the pivot point of said mold carriage to a second unloading positions, fifth means swinging said mold carriage in one direction to align said first female mold section with said male mold section and then in the opposite direction to align said second female mold section with said male mold section, and sixth means rotating said eccentric shaft in said one direction so as to raise said mold carriage to a level sufficient for the alignment of one of said first and second female mold sections in engagement with said male mold section to form said mold cavity therewith.

2. An injection molding machine as defined by claim 1 further including seventh means for sequentially operating said fourth means for rotating said eccentric shaft and said means for swiveling said mold carriage so that each of said first and second female mold sections in turn is (a) swung into alignment with said male mold section, (b) moved upward into tight engagement with said male mold section, (c) moved downward away from said male mold section, and (c) swung out of alignment with said male mold section, and means for operating said extruder head so that said moldable material is extruded into the cavity formed by said male mold section and the aligned one of said first and second female mold sections immediately after said eccentric shaft has been rotated in said one direction to effect said tight engagement.

3. An injection molding machine as defined by claim 3 further including eighth means for removing molding parts from each of said first and second like female mold sections after each said female mold section is in said second position.

4. An injection molding machine as defined by claim 1 further including means for evacuating said mold cavity formed between each of said first and second like female mold sections and said male mold section, and means for operating said evacuating means before operation of said extruder means.

5. An injection molding machine as defined by claim 1 where-in said mold carriage and said pivot carriage are coupled by a second shaft journaled in said pivot carriage, and further wherein said guide means engage the ends of said second shaft.

6. An injection molding machine as defined by claim 5 wherein said second shaft forms the pivot axis for said mold carriage.

7. An injection molding machine as defined by claim 1 wherein said first and second like mold sections are aligned in a vertical plane extending at right angles to said eccentric shaft.

8. An injection molding machine as defined by claim 1 wherein said means for swiveling said mold carriage comprises a double action fluid pressure actuator, each end of which is connected to a common heat expansion off-setting activating rod which is in turn pivotally connected to said mold carriage.

9. An injection molding machine as defined by claim 1 further including means for removing finished parts from said first and second mold sections when each is in its second unloading position, said means comprising like extractor members on opposite sides of said frame and means for reciporcating said extractor members along paths extending parallel to said eccentric shaft.

10. In apparatus adapted for single cavity injection molding, said apparatus including:
  1. a mold composed of at least first and second mating mold halves which together define a mold cavity, said first mold half being provided with an injection conduit connecting with said mold cavity, and said mold halves being adapted to be repetitively closed and then opened to permit removal of the molded part,
  2. injection means adapted to inject a moldable material through said injection conduit while said mold halves are closed,
  3. support and alignment adapted to open and close said mold halves while maintaining alignment thereof, and
  4. a framework supporting all of the above; the improvement comprising:
    having only one of said first mold halves and at least two of second mold halves with said support and alignment means including a yoke adapted to receive and support each of said second mold halves reciprocally in two positions: a first position mating with said first mold half and a second unloading position out of alignment with said first mold half; said support and alignment means comprising a carriage supported by said framework and moveable back and forth along the center line of said mold cavity to effect the opening and closing action of said mold halves, and said yoke being Y-shaped with each upper arm thereof mounting one of said second mold halves, said yoke being pivotally mounted on said carriage for reciprocating rotation in a plane inclusive of said center line to and from said first and second positions.

11. The apparatus of claim 10 wherein said support and alignment means are adapted to bring said mold halves into relatively close alignment and said first and second mold halves are adapted to effect fine self-alignment during the final closing movement.

12. The apparatus of claim 11 wherein said mold halves when closed are adpated to form a hermetic seal and including vacuum means adapted to evacuate said mold cavity after mold closing and prior to injection of said elastomer precursor.

13. The apparatus of claim 10 wherein said apparatus includes eject means for removing the completed seal from said second mold half and insertion means for inserting a casing, both when said second mold half is in said second position.

* * * * *